United States Patent [19]
Häb-Umbach et al.

[11] Patent Number: 5,950,166
[45] Date of Patent: *Sep. 7, 1999

[54] SPEECH ACTUATED CONTROL SYSTEM FOR USE WITH CONSUMER PRODUCT

[75] Inventors: Reinhold Häb-Umbach, Aachen, Germany; Franciscus J. Op De Beek, Amersfoort, Netherlands

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/582,713

[22] Filed: Jan. 4, 1996

[30] Foreign Application Priority Data

Jan. 4, 1995 [EP] European Pat. Off. ............... 95200004

[51] Int. Cl.$^6$ ....................................................... G10L 3/00
[52] U.S. Cl. ............................................................ 704/275
[58] Field of Search ........................... 395/2.84; 704/275

[56] References Cited

U.S. PATENT DOCUMENTS

| 4,827,520 | 5/1989 | Zeinstra | 395/2.84 |
| 5,267,323 | 11/1993 | Kimura | 381/110 |
| 5,450,525 | 9/1995 | Russell | 395/2.84 |
| 5,584,052 | 12/1996 | Gulau et al. | 395/2.84 |

FOREIGN PATENT DOCUMENTS

0078016B1  11/1985  European Pat. Off. .......... G10L 7/08

*Primary Examiner*—Kee M. Tung
*Attorney, Agent, or Firm*—Edward W. Goodman

[57] ABSTRACT

A speech-actuated control system for use with a consumer product, and in particular, in an automotive vehicle, recognizes a speech command and has a sequencer for after the recognition, effecting a change of state in the control. In particular, a plurality of different commands are recognized. The system has a mechanical actuator for, after the recognition, allowing a specifier command for specifying the most recently recognized speech command. The specifying effects a differential setting change in either of two opposite directions.

17 Claims, 2 Drawing Sheets

SPEECH ACTUATED CONTROL SYSTEM FOR USE WITH CONSUMER PRODUCT

BACKGROUND OF THE INVENTION

1. Field of the Invention

The invention relates to a speech-actuated control system for use in a consumer product. The speech-actuated control system includes a recognizer for recognizing a speech command and a sequencing unit fed by the recognizer for temporally, subsequent to the recognizing, effecting a change of state in the control system.

2. Description of the Related Art

Speech communication in a user interface organization has been described in European Patent Application EP-A-360 352, corresponding U.S. Ser. Nos. 07/327,198, 07/826,277 (PHN 12.683) to the present Assignee. European Patent Application EP-B1-78016 describes a system for recognizing a speech command subsequent to actuation of a mechanical switch that enables the recognition, while the speech recognition, when effected, holds the command so recognized during a predetermined interval. The known system allows only a limited range of command specifications, inasmuch as only a single button is provided that controls the recognizer. Inverting the sequence of recognizing and finalizing the command by button actuation allows a much wider range of commands and also allows a user interface more sympathetic to the operator.

SUMMARY OF THE INVENTION

In consequence, amongst other things, it is an object of the present invention to smoothen the user interface of the system for use in a consumer product. Such consumer products should be designed for an inexperienced and non-professional user; typically they are operative for producing audio/video output. Now, according to one of its aspects, the invention is characterized in that said recognizer means is arranged for specifically recognizing a plurality of different commands, and said system comprises mechanical actuator means that is enabled by said sequencing means for then being receptive to a specifier command for specifying the most recently recognized speech command. Especially in a consumer electronics environment, the effecting of the specifying, after the speech recognition has been felt, is extremely straightforward and offers little, distraction to the inexperienced user person. One possibility would be that the specifier recurrently steps through a sequence of successive parameter values that are organized in a loop. For example, if there are ten parameter values numbered 0 through 9, successive steps are from 0, 1, ... to 9 and then back to 0 for starting a new cycle.

Advantageously, said mechanical actuator means is bidirectionally active for effecting a differential setting change in either of two opposite directions. It has been found that bidirectional differentials are easy to manipulate. In this case, still only two buttons need be present. The size of the differences may be discrete and one-shot, so that each actuation causes one finite step. Alternatively, prolonged actuation may cause a cumulating repetition of such steps. Still another possibility is that actuation causes a smooth variation in an associated direction.

Advantageously, said system comprises an enabling actuator for enabling said recognizing means. In this way, the recognition system is not error prone, because it is effectively disabled during most of the time.

Advantageously, said system comprises continuously operative speech buffer means for receiving said speech, said recognizer means being fed by said buffer means for allowing recognizing of speech received immediately before actuation of said enabling actuator. In this way, the speech command may begin some time before the actuation of the enabling actuator, while still rendering correct functionality.

The invention also relates to an automotive vehicle provided with a system as described above. Especially in an automotive environment, the much-plagued driver should be distracted as little as possible. The one or more actuators according to the invention are advantageously physically integrated in the steering wheel or other mechanical steering activator. This no longer necessitates removing a hand from the steering actuator when a control setting is to be changed. Advantageously, a system according to the invention then allows for recognizing an RDS (Radio Data System) command. In this way, functionality is still further enhanced. The invention also relates to a remote control arrangement comprising a system according to the invention. Here, the recognition may be located inside the remote control device or in the controlled apparatus itself. In this way, the button count of the remote device may diminish dramatically.

Further advantageous aspects of the invention are readily apparent from reading the specification.

BRIEF DESCRIPTION OF THE DRAWINGS

These and other aspects and advantages will be described more in detail with reference to the description of referred embodiments hereinafter, and, in particular with, reference to the accompanying drawings, in which.

DESCRIPTION OF THE PREFERRED EMBODIMENTS

Figure 1:
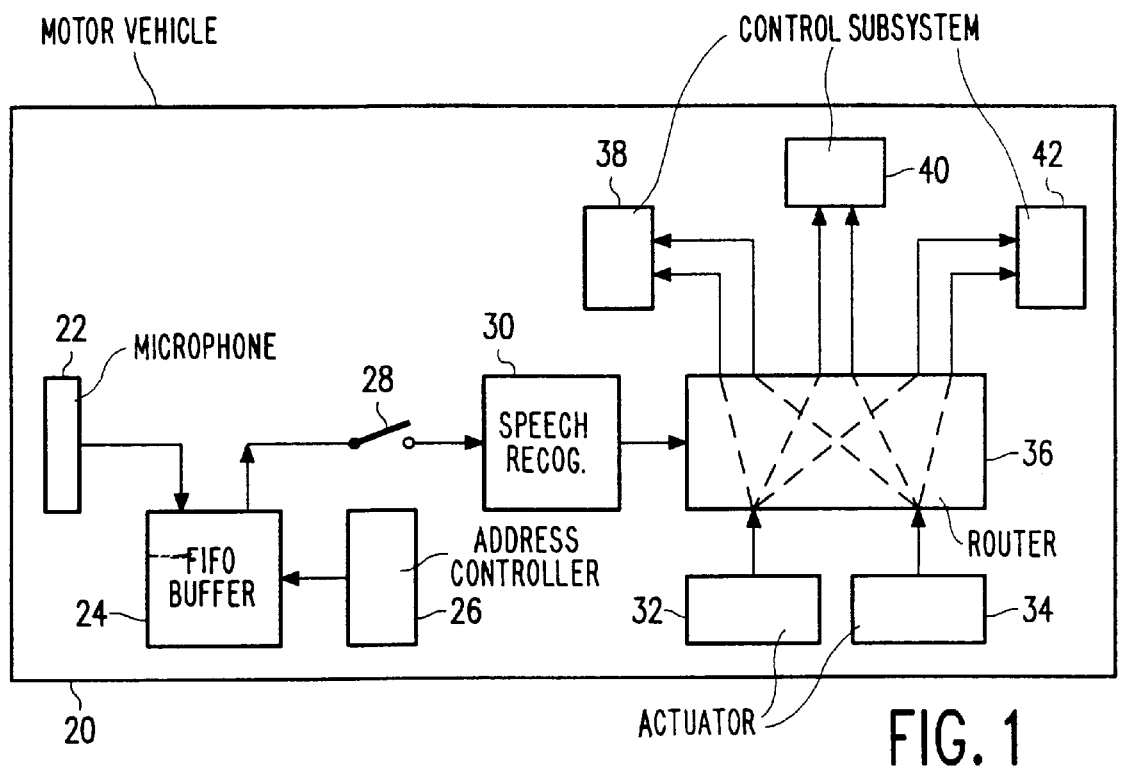
FIG. 1 illustrates a diagram of a motor vehicle having the invention.

FIG. 1 shows an exemplary block diagram of a motor vehicle containing the invention, which environment and embodiment should not be considered in a restrictive manner. Various subsystems of such a motor vehicle 20 are common general knowledge and will not be considered in detail. According to the invention, there is a microphone 22 provided with A/D conversion that recurrently samples the received speech. For simplicity, any analog signal filtering in the system is left out of consideration. Also, the mutual synchronization of the various subsystems is taken for granted. The samples are stored in a cyclic FIFO buffer 24 under control of cycling address controller 26. With respect to the present invention, a storage latency interval of 0.2–0.5 seconds is usually appropriate. As long as enabling actuator 28 is in rest, nothing happens. When the latter is, however, activated, speech recognizer 30 gets into operation. Alternatively, the speech recognizer is continuously operative. It may operate according to known principles and recognize any one among a plurality of commands that typically consist of a single word. After recognition, it may send an associated code and activation signal to the router subsystem 36. The latter remains activated for a predetermined interval, such as ten seconds, or alternatively, persistently. During activation, the signals from actuators 32, 34 are sent to one of the destination control subsystems 38, 40, 42, that has been selected by the actually recognized command, for therein effecting differential changes in either of two opposite directions. The change may involve stepping in a particular direction, such as up versus down. Another possibility is a control signal for an analog motor that will turn left or right. A yes versus no choice is feasible as well. The mechanical actuators 32, 34 may keep their functionality after activation quasi-infinitely, or, alternatively, may have a default functionality, in that after the above interval of ten seconds, they would again become operative for a particular control, either with respect to two opposite differential directions, or otherwise. A different detail may be that the actuators 28, 32, and 34 are functionally integrated, which may be done in various different ways. A first one is that the default functionality of actuators 32, 34 represents the one of actuator 28. A second one could be that co-actuation of both of actuators 32, 34 would represent actuation of actuator 28. Generally, all actuators are pushbuttons, but this is not an effective limitation. They could be, as well, soft keyboard parts, a single toggle button, or otherwise. A programmed extra may be that the timeout of router 36 is reset after a subsequent command has been recognized by recognizer 30.

Various elements of the motor vehicle may be controlled by the system as shown:

a. Car radio: station by name or frequency value (this could lead automatically to the up-down controllability of the audio volume through the bidirectional differential setting)
b. CD-player: title list (scanning) audio controls (as a.)
c. Car telephone: personal directory (scan)
d. Navigation System: call destination (scan)
e. RDS: call program type (scan)
f. Car functionality: windows (up/down) temperature control (up/down)

Figure 2:
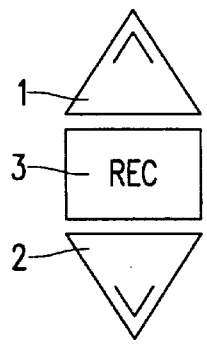
FIG. 2 illustrates a functionally integrated version of the actuators.

FIG. 2 shows a functionally integrated version of the actuators. The central button activates the recognition operation. The advantage of such a recognition actuator is that spurious recognition of spoken terms, which can occur in unrelated text, is now generally avoided. Also, the provision of various parallel voice recognition channels, such as, for dictation, car telephone and others, becomes feasible without mutual interference. When the speech has been recognized, the upper button 1 and lower button 2 become operational for a particular functionality and during a predetermined interval, that may be infinite. Subsequently, they may become "dead", get a default functionality, or maintain their old functionality. The three buttons may be integrated still further, such as, by:

assigning the function of button 3 to either one among buttons 1,2.
assigning the function of button 3 to the combined actuation of buttons 1, 2. Both integrations leave out button 3 itself.

The actuators, when used in a motor vehicle, may be physically integrated with the steering wheel or steering actuator of another type.

Figure 3:
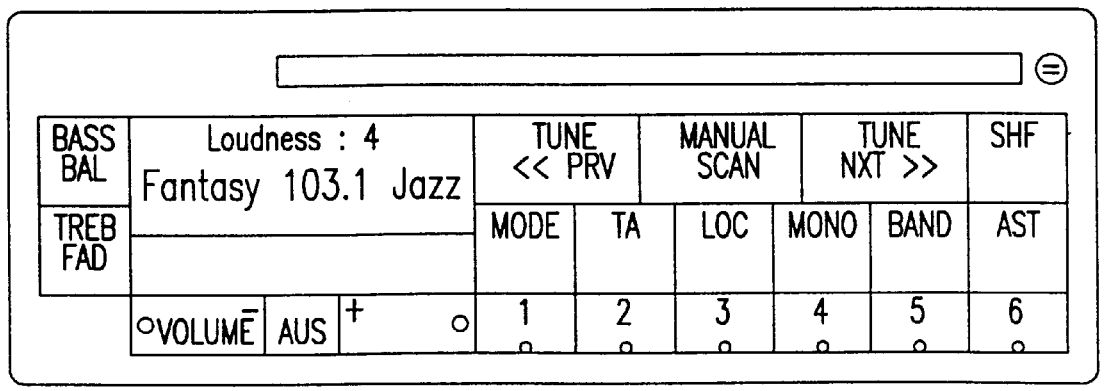
FIG. 3 illustrates a front of a car radio for use with the invention.

FIG. 3 shows an example of a front of a car audio device for use with the invention. By itself, the front may be conventional, but leaving out various up/down actuators may bring about a cleaner appearance front, and/or may allow for a smaller front size. The prominent display top left shows actual broadcast frequency and character of the tuned station; also actual loudness level is indicated. Various standard actuators have been shown for bass balance, treble fader, previous and next tune, and manual scan (in recorder deck facility, such as digital compact cassette or CD), mode (such as AM versus FM), TA (Traffic Announcements, that is a functionality of the Radio Data System principle, wherein a most recently received traffic announcement is stored, and then, upon activation of the TA button, retrieved from storage), mono/stereo, waveband, and a few others, that are irrelevant to the present invention. Also buttons for six preferential stations are available. Various ones of the incremental controls shown may be rendered programmable according to the invention. In doing so, the original standard button(s) may either be retained or omitted. Incremental controls so programmable may selectably relate to various different consumer products integrated together, such as in a motor vehicle, or in a stereo tower. A different embodiment is that the one or more buttons, according to FIG. 2, are present on a remote control device for such stereo tower, household appliance, or other consumer device or system. The lowering of the number of buttons on such device renders it less error-prone. Also an improved look of the remote control device may result. If the user of such remote control device has forgotten the appropriate commands, these may be scrollably shown on a small display, either on the remote control device itself, or on the apparatus controlled thereby.

Figure 4:
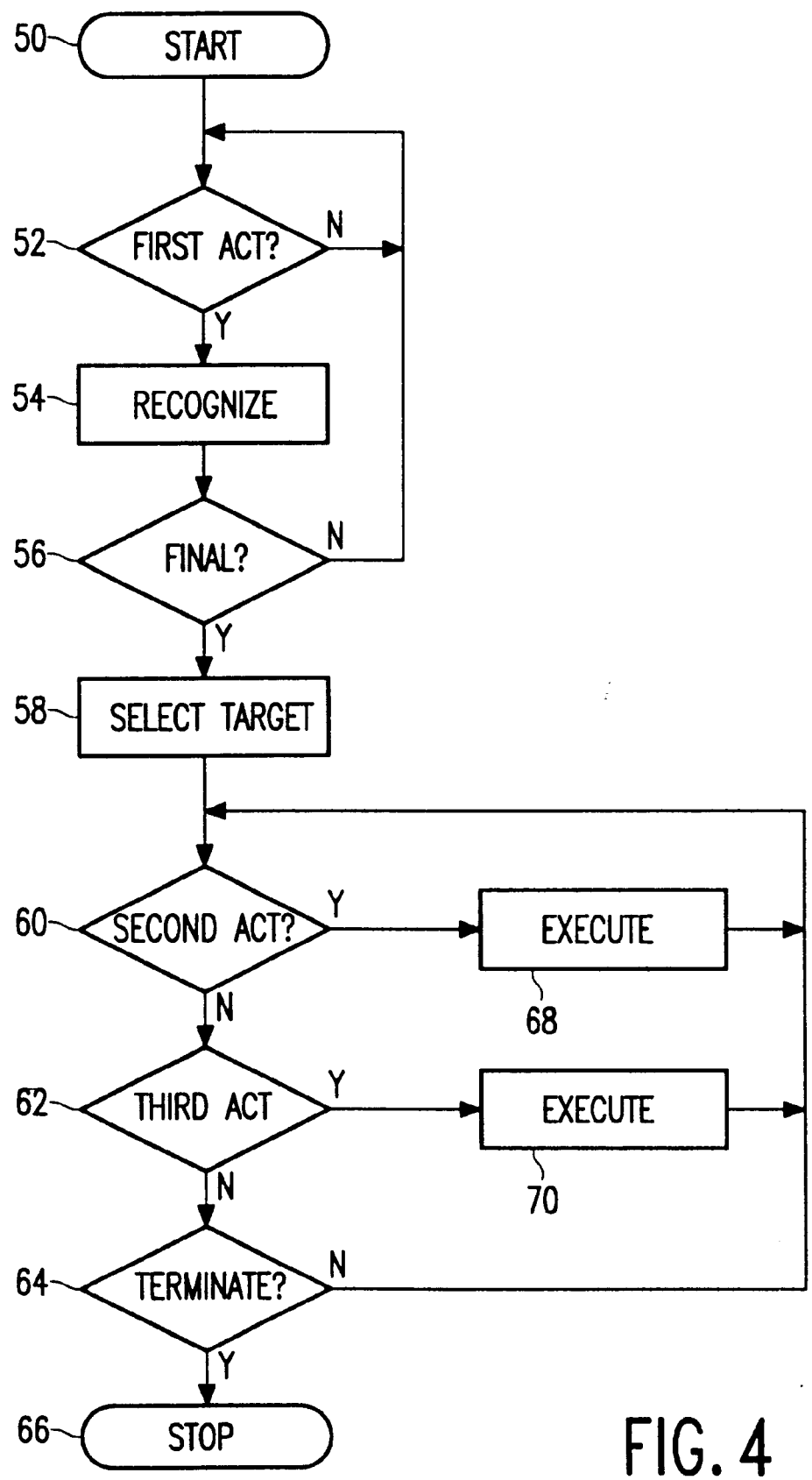
FIG. 4 illustrates a flow chart for use with the invention.

FIG. 4 shows a flowchart for use with the invention. In block 50, the system is rendered operational, such as, by inserting the ignition key. In block 52, the system detects actuation of button 3 in FIG. 2. If no, a waiting loop is executed, and the system reverts to block 52. When actuation has taken place, in block 54 actual speech recognition is executed. If failed, the system reverts once more to block 52 (not shown). In block 56, it is detected whether the recognized speech term is a final one or should be followed by one or more subsequent qualifier terms. For example, if radio data is present, the recognizer may be able to recognize the actual name of an intended station, whereas the internal management will then associate the code thereof received by RDS with an optimum frequency. Likewise, the user may give a verbal request for a particular type of program, such as "classical music", "jazz music", or "news". Also then, the system chooses a particular station, that is judged as the best one. For example, it is the one with the strongest signal. Subsequent control of the reception is effected by the up/down button pair. If the final term has been recognized in block 54, the system will directly go to block 58. In block 58, the target functionality is selected (broadcast frequency, loudness, windows up/,down, etcetera). Blocks 60, 62, 64 constitute a waiting loop that is recurrently traversed until either one of the up/down buttons is activated (blocks 60, 62), or until the predetermined time has lapsed (64), or alternatively, until a new functionality will have been rendered programmable through appropriate speech input. In the latter case, the return from blocks 64, 68, 70 should go to the block 52. If the button is actuated, the associated differential setting change is effected (Blocks 68, 70), and the system reverts to block 60. When time has finished, the system goes to block 66: stop. In fact, the latter may also allow re-entrance to block 52. Detecting a power-off switching at an appropriate part of the loop may represent an alternative termination.

Various refinements may be introduced to cope with user errors or to extend the functionality.

What is claimed is:

1. A speech-actuated control system for use in a consumer product, said control system comprising:
   means for receiving a speech command from a user of said speech-actuated control system;
   recognizer means for specifically recognizing a plurality of different speech commands from said receiving means, and for generating an output signal determined by the recognized speech command;

first operational means manually engagable by the user, the first operational means selectively coupling an output of said receiving means to an input of said recognizer means;

sequencing means having input for receiving the output signal of said recognizer means, the sequencing means effecting a change of state in said speech-actuated control system based on the output signal of the recognizer means, said change of state including the selection and engagement of one of a plurality of control functions of the consumer product, each of said control functions having at least one adjustable setting; and second operational means manually controllable by said user for interfacing with the selected and engaged control function, the second operational means being enabled by said sequencing means thereby allowing the user to adjust said at least one adjustable setting of the selected and engaged control function.

2. A speech-actuated control system as claimed in claim 1, wherein said second operational means is bidirectionally active for effecting a differential adjustment in one of two opposite directions of said at least one adjustable setting of the selected control function.

3. A speech-actuated control system as claimed in claim 2, wherein said differential adjustment is discrete and cumulative.

4. A speech-actuated control system as claimed in claim 3, wherein said first operational means comprises an enabling actuator for enabling said recognizing means.

5. A speech-actuated control system as claimed in claim 2, wherein said first operational means comprises an enabling actuator for enabling said recognizing means.

6. A speech-actuated control system as claimed in claim 1, wherein said first operational means comprises an enabling actuator for enabling said recognizing means.

7. A speech-actuated control system as claimed in claim 6, wherein said speech-actuated control system further comprises continuously operative speech buffer means for receiving said speech command from said receiving means, wherein an output of said speech buffer means is coupled to the input of said recognizer means by said first operational means enabling recognition of speech stored in said speech buffer means immediately before actuation of said enabling actuator.

8. A speech-actuated control system as claimed in claim 6, wherein said enabling actuator is functionally integrated with said second operational means.

9. A speech-actuated control system as claimed in claim 6, wherein said enabling actuator is functionally integrated with said second operational means.

10. A speech-actuated control system as claimed in claim 6, wherein said speech-actuated control system further comprises timeout means, under control of any of said recognizer means and said enabling actuator, for starting a fixed-length time-out interval for said second operational means being enabled to adjust the at least one adjustable setting of said selected control function.

11. A speech-actuated control system as claimed in claim 1, wherein said consumer product comprises an audio signal generating system.

12. A speech-actuated control system as claimed in claim 1, wherein said second operational means has a default functionality.

13. A remote control arrangement comprising a speech-actuated control system for use in a consumer product, said speech-actuated control system comprising:

means for receiving a speech command from a user of said speech-actuated control system;

recognizer means for specifically recognizing a plurality of different speech commands from said receiving means, and for generating an output signal determined by the recognized speech command;

first operational means manually engagable by the user, the first operational means selectively coupling an output of said receiving means to an input of said recognizer means;

sequencing means having input for receiving the output signal of said recognizer means, the sequencing means effecting a change of state in said speech-actuated control system based on the output signal of the recognizer means, said change of state including the selection and engagement of one of a plurality of control functions of the consumer product, each of said control functions having at least one adjustable setting; and second operational means manually controllable by said user for interfacing with the selected and engaged control function, the second operational means being enabled by said sequencing means thereby allowing the user to adjust said at least one adjustable setting of the selected and engaged control function.

14. A motor vehicle comprising a speech-actuated control system for use in a consumer product, said speech-actuated control system comprising:

means for receiving a speech command from a user of said speech-actuated control system;

recognizer means for specifically recognizing a plurality of different speech commands from said receiving means, and for generating an output signal determined by the recognized speech command;

first operational means manually engagable by the user, the first operational means selectively coupling an output of said receiving means to an input of said recognizer means;

sequencing means having input for receiving the output signal of said recognizer means, the sequencing means effecting a change of state in said speech-actuated control system based on the output signal of the recognizer means, said change of state including the selection and engagement of one of a plurality of control functions of the consumer product, each of said control functions having at least one adjustable setting; and second operational means manually controllable by said user for interfacing with the selected and engaged control function, the second operational means being enabled by said sequencing means thereby allowing the user to adjust said at least one adjustable setting of the selected and engaged control function.

15. A motor vehicle as claimed in claim 14, wherein at least one of said first and second operational means is physically integrated in a steering actuator of said motor vehicle.

16. A motor vehicle as claimed in claim 14, wherein at least one of said first and second operational means enables recognition of a spoken radio data system command.

17. A motor vehicle as claimed in claim 14, wherein at least one of said first and second operational means enables recognition of a spoken radio data system command.

* * * * *